Sept. 17, 1968       A. E. LARSEN       3,401,750
             FLAME REPELLANT APPARATUS
Filed Jan. 17, 1968                       2 Sheets-Sheet 1

INVENTOR.
AGNEW E. LARSEN
BY Harry M. Saragovitz
Edward J. Kelly, Herbert Berl
& S. Dubroff       ATTORNEYS Sept. 17, 1968  A. E. LARSEN  3,401,750
FLAME REPELLANT APPARATUS
Filed Jan. 17, 1968  2 Sheets-Sheet 2

INVENTOR.
AGNEW E. LARSEN
BY
ATTORNEYS

United States Patent Office 3,401,750
Patented Sept. 17, 1968

3,401,750
FLAME REPELLANT APPARATUS
Agnew E. Larsen, 122 E. Butler Ave.,
New Britain, Pa. 18901
Continuation-in-part of abandoned application Ser. No. 461,211, June 3, 1965. This application Jan. 17, 1968, Ser. No. 698,562
13 Claims. (Cl. 169—2)

ABSTRACT OF THE DISCLOSURE

As an abstract of the disclosure, the invention is directed to flame repellant injection apparatus particularly adapted for emergency fire situations adjacent an aircraft fuel tank whose flammable fluid can be quickly converted to a non-flammable condition by use of ballistic or propellant cartridge gas generating media to rapidly deliver flame repelling chemical agents to permeate the fuel tank.

---

The invention described herein may be manufactured and used by or for the Government for governmental purposes without the payment to me of any royalty thereon.

This application is a continuation-in-part of applicant's co-pending application, Ser. No. 461,211 filed June 3, 1965, now abandoned.

This invention relates to flame repellant or fire prevention apparatus and, more particularly, to such apparatus which is especially useful in emergency fire situations dangerously adjacent a fuel tank or the like of an aircraft or other mobile vehicles.

The persistent occurrence of catastrophic fires in many aircraft accidents, in spite of existing and highly developed fire suppression systems, indicates the need for more effectual and satisfactory fire prevention means for aircraft and other forms of transportation.

It is an object of the invention to provide flame repellant apparatus having ultra-rapid actuation and capable of converting flammable fluid to a non-flammable condition.

In one aspect of the invention the flame repellant apparatus includes a tubular housing having a closed rearward end and an orificed forward end on either side of slidable piston normally defining forward and rearward chambers, ballistic means in fluid communication with the rearward chamber and having ignition means therefor, a seal rearwardly overlying the forward end orifice, and a flame repellant in the forward chamber.

In another aspect of the invention a plurality of flame repellant tubular housings are provided, with their rearward ends commonly mounted to a multiple fluid passage connector.

These and other objects, features and advantages will become apparent from the folowing description and accompanying drawing in which:

FIG. 3 is a perspective view of the multiple passage mounting connector of the FIG. 2 arrangement.

Figure 1:
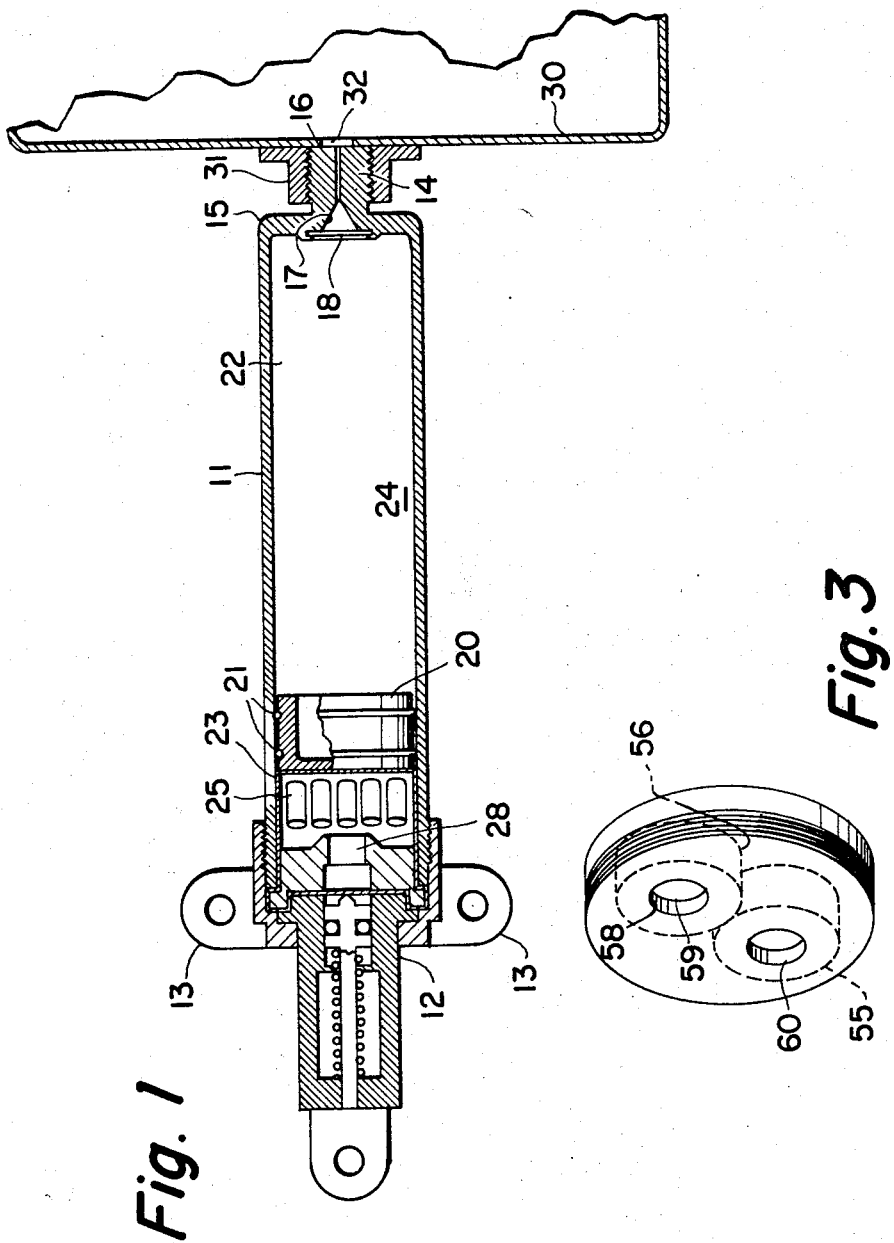
FIG. 1 is a sectional view of one arrangement embodying the principles of the invention.

The tubular housing 11 (FIG. 1) is provided with a closed rearward end 12 having laterally extending mounting lugs 13, 13 for securement to an appropriate supporting structure (not shown). The forward end wall 15 of the housing is provided with a central reduced forward threaded projection 14 which has a central minutely-dimensioned, injector orifice 16 and tapered annular approach portion 17 therefor normally closed by a suitably mounted rupturable, sealing disc 18. The disc 18 extends across the rearward side of orifice approach portion 17. Within the housing is a slidably mounted piston member 20 having peripheral O-ring seals 21 to sealingly divide the housing interior into normally, relatively large forward and small rearward chambers, 22 and 23, respectively.

The forward chamber 22 is substantially filled with flash or flame repellant chemicals 24. The rearward chamber 23 contains a propellant cartridge 25 immediately rearward of piston 20. The cartridge 25 has an appropriate mechanical and/or electrical ignition means preferably connected to a suitably located manual or heat sensitive actuating means (not shown). By way of example, one form of initiator is shown in which a spring responsive firing pin 26 is aligned with for striking a centrally located cartridge primer 28.

The skin or wall 30 of an aircraft fuel tank or the like is provided with an internally threaded attachment member 31 that encompasses tank wall opening 32 for receiving the threaded projection 14 in a manner to align orifice 16 with tank wall opening 32.

When the emergency exists and the tank containing a large volume of flammable fluid, from gasoline to volatile gases such as propane, is subjected to the hazard of fire, the cartridge propellant may be ignited and the rapidly formed pressure gas generated thereby will quickly move piston 20 forward to compress the flame repellant fluid 24 to a pressure sufficient to rupture the sealing disc 18 prior to being effectively delivered through injector orifice 16 at sufficiently high velocity to fully permeate the tank fluid with flash or flame repellant means for prevention of explosion or further spreading of the fire.

Once the propellant initiator has been actuated, the ultra-rapid conversion of flammable fluid to a non-flammable condition wil be performed in time period of milliseconds.

Where multiple flame repellant agents are required or desired, either delivered in unison or sequentially, to render tank gasoline non-flammable, multiple propellant charge delivery may be provided for actuating corresponding pistons of flame repellant chambers. Where predetermined ratios are required of the multiple agents, the sizes or dimensions of the respective chambers and/or their orifices may be designed accordingly.

Figure 2:
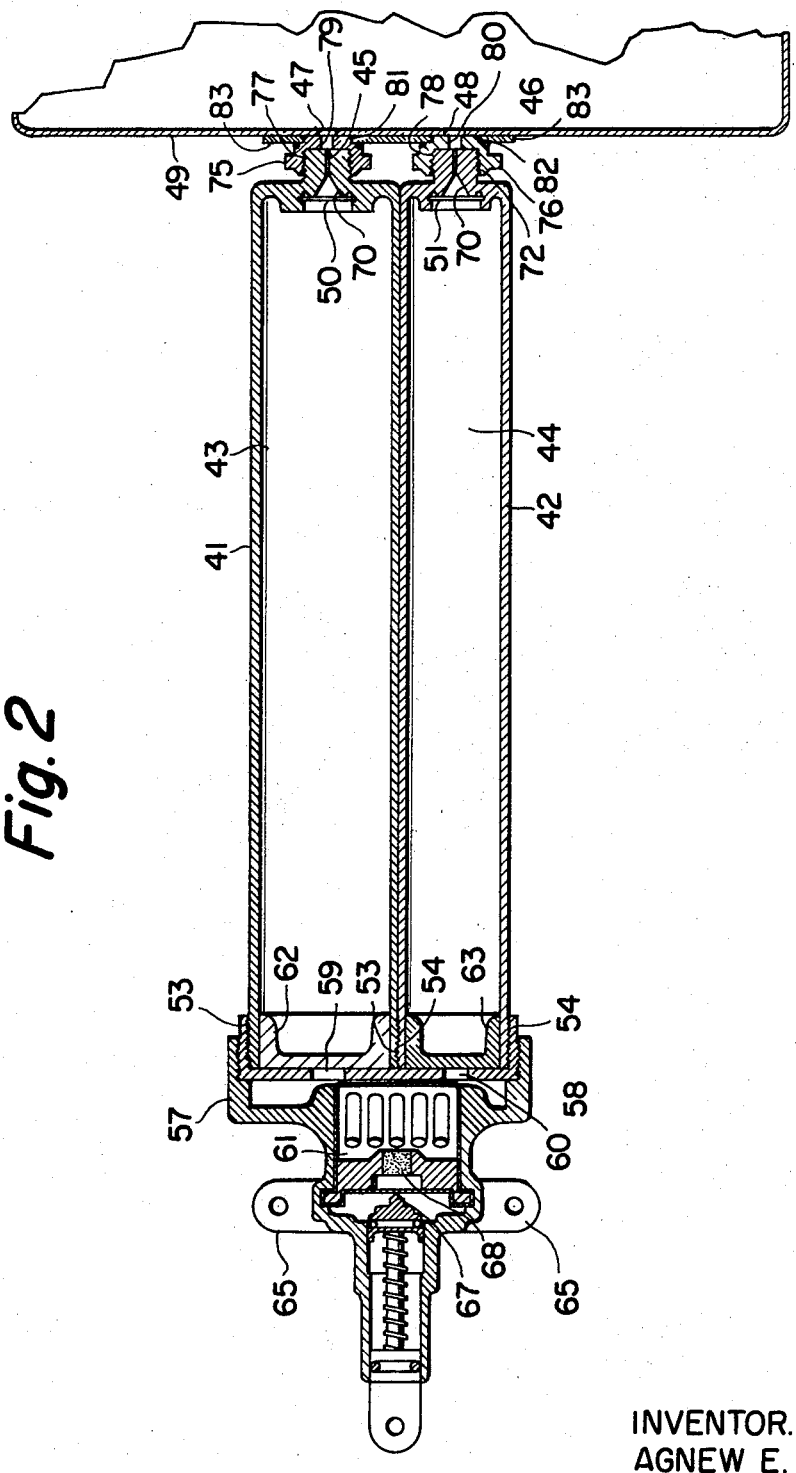
FIG. 2 is a sectional view of a preferred modification of the FIG. 1 arrangement.

In the FIG. 2 embodiment a plurality of adjacent tubular housings 41, 42, each containing a liquid or fluid flame repellant chemical agent 43, 44 have closed end walls. The respective forward walls are orificed at 45, 46 for injecting the chemicals 43, 44 through appropriate openings 47, 48 in the wall 49 of a fuel container or tank for the purpose of jelling or solidifying the flammable tank fluid in a manner similar to the FIG. 1 arrangement. Rupture discs 50, 51, having a withstanding pressure range of 2500 to 4500 p.s.i., normally seal the respective flame repelling agents from the corresponding orificed ends that are suitably threaded for connection to tank wall 49 as will be hereinafter described.

The rearward ends of tubes 41, 42 are threaded for securement to the threaded forward openings 53, 54 of mounting or tube adapter 55 (FIGS. 2, 3) which has the rearward external surface 56 threaded for securement to the internally threaded, enlarged forward end of cartridge housing 57. The rear wall 58 of tube adapter 55 has appropriate openings 59, 60 for placing the gas generating propellant cartridge 61 in fluid communication with the rearward surfaces of pistons 62, 63 that are slidingly and sealingly mounted in the rearward ends of the corresponding cylinders 41, 42 initially adjacent the rear wall 58 of tube adapter 55. The laterally extending mounting lugs 65, 65 enable securement to an appropriate supporting structure (not shown). Where applicable the FIG. 2 embodiment includes the characteristics of the FIG. 1 apparatus, including the aligned firing pin 67 and primer 68, tapered orifice approach portions 70, 70 and similar cartridge ignition means.

Preferably, the orificed forward ends of tubes 41, 42 are provided with right hand external threads 71, 72 for matingly receiving corresponding right hand internal threads of respective connector nipples 75, 76 whose forward and internally flanged ends are provided with left-hand external threads 77, 78 as well as a central opening 79, 80 for respectively communicating orifice 45 with tank opening 47 and orifice 46 with tank opening 48 when tubes 41, 42 are connected to the tank via connector nipples 75, 76. Preferably, each connector nipple or threaded coupling 75, 76 is partially rearwardly threaded (right hand) a predetermined distance onto the respective tube and threads 71, 72 such that threaded connection of nipple reduced portions 77, 78 forwardly into matingly threaded openings 81, 82 of a mounting plate 83 suitably secured, as by welding, to the tank skin 49 will, in turnbuckle like fashion, draw the tube ends 71, 72 into a secure connection upon the tank wall 49. An O-ring 84 or compression type flat washer is provided for sealing the opposing pairs of faces between the nipples 75, 76 and the mounting plate 83.

When the flammable fluid contained tank is subjected to the hazard of fire, propellant cartridge 61 is ignited and the generated gas pressure will rapidly tend to move pistons 62, 63 forward to compress the flame repellant agents 43, 44 to the predetermined pressure sufficient to rupture sealing discs 50, 51 prior to being effectively delivered through injector orifices 45, 46 to fully mix and permeate the tank fluid with the flame repellant chemical agents 43, 44.

It is considered that the inclusion of such a fire prevention means becomes a desirable addition to present personnel escape systems for the avoidance of an uncontrolled fire hazard created by the abandoned aircraft.

Various modifications, changes or alterations may be resorted to without departing from the scope of the invention as defined by the appended claims.

I claim:
1. Flame repellant apparatus comprising
   a plurality of longitudinally extending tubular housings each having closed end walls,
   piston means slidably mounted in each of said housings and normally dividing the interior of each housing into corresponding forward and rearward compartments,
   an orifice smaller than said piston means in each of the forwardmost ones of said end walls,
   means normally sealing each of said orifices from the corresponding forward compartments,
   separate flame repellant means in said forward compartments, and
   gas generating means in fluid communication with said rearward compartments for rapidly compressing said repellant means to render said seal means ineffective and thereby deliver said repellant means through said orifice.

2. The apparatus of claim 1 wherein a mounting connector supports the rearward ends of said tubular housings, said connector having corresponding pasasges fluidly communicating each of said pistons with said gas generating means.

3. The structure of claim 2 in which each of said orificed ends carry a threaded coupling for connecting said apparatus to a flammable container.

4. The structure of claim 1 wherein each of said orifice sealing means includes a rupturable disc having the capacity of withstanding a predetermined flame repellant pressure build-up before rupturing.

5. The structure of claim 4 in which said flame repellant means are separate fluids.

6. The structure of claim 4 in which at least one of said flame repellant means is a liquid.

7. The structure of claim 4 wherein said flame repellant means are separate liquids.

8. Flame repellant apparatus comprising
   a tubular housing having closed end walls,
   a piston slidable in said housing and normally dividing the interior of said housing into forward and rearward compartments,
   an orifice smaller than said piston in the forwardmost one of said end walls,
   a rupturable disc normally sealing said orifice from said forward compartment,
   flame repellant means in fluid communication with said forward compartment, and
   gas generating means in fluid communication with said rearward compartment for rapidly compressing said repellant means to render said seal means ineffective and thereby deliver said repellant means through said orifice.

9. The arrangement of claim 8 in which said housing forward end is provided with threaded means for attaching said housing to a flammable container.

10. Flame repellant apparatus comprising
    a tubular housing having a closed rearward end and a centrally orificed forward end, said forward end including a diminishing tapered annular orifice approach portion to define a constricting nozzle,
    a piston slidably mounted in said housing and having peripheral seal means thereon engaging the housing interior, said piston and seal means normally dividing said tubular housing into relatively large forward and small rearward chambers,
    a propellant in said rearward chamber,
    means for igniting said propellant,
    a rupturable disc seal rearward overlying said tapered approach portion of said orificed end for preventing fluid flow prior to predetermined pressure build-up for high velocity fluid ejection, and
    a fluid flame repellant substantially filling said forward chamber between said piston and seal.

11. The apparatus in accordance with claim 10 wherein said housing forward end is provided with threaded means for attaching said housing to a flammable fluid container.

12. The structure set forth in claim 10 in which the housing forward end is secured to a fuel tank, said tank having an opening larger than and aligned with the orifice of said forward end.

13. The structure of claim 10 wherein said flame repellant is a liquid.

References Cited

UNITED STATES PATENTS

| 2,736,386 | 2/1956 | Klompar | 169—28 |
| 2,822,877 | 2/1958 | Post | 169—28 |
| 2,838,122 | 6/1958 | Hutchinson | 169—28 |

FOREIGN PATENTS

| 173,13 | 8/1913 | France. |
| | | (Addition to No. 441,931) |
| 586,992 | 1/1925 | France. |
| 5,039 | 2/1911 | Great Britain. |

EVERETT W. KIRBY, *Primary Examiner.*